Dec. 2, 1969         D. B. WICKER ETAL         3,481,806
METHOD OF MAKING A BANDAGING AND DRESSING MATERIAL
Original Filed Sept. 23, 1964                 2 Sheets-Sheet 1

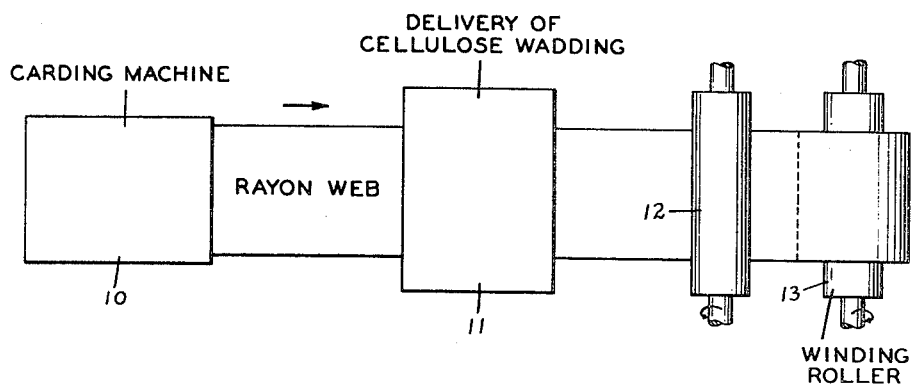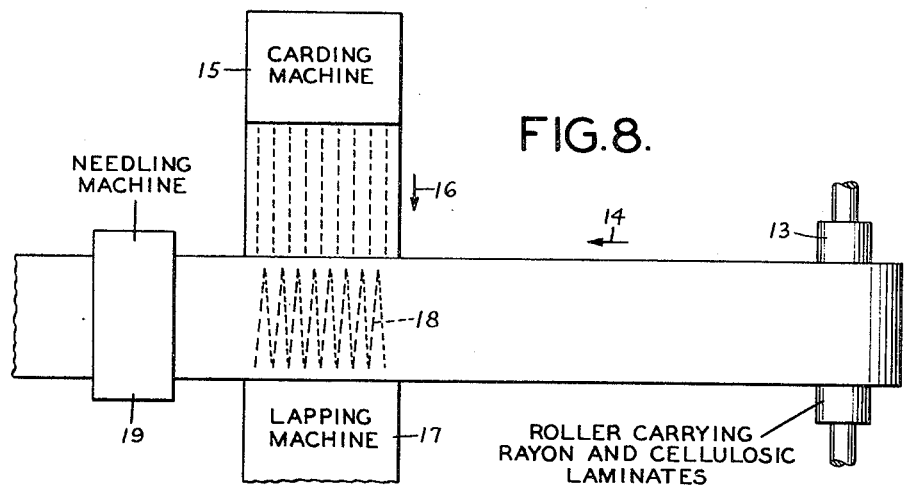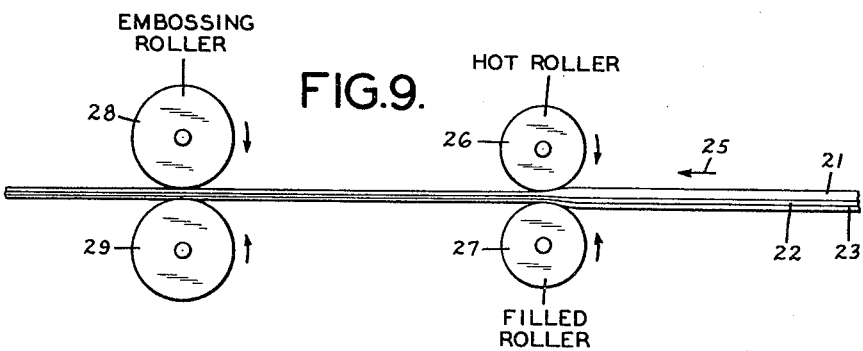

United States Patent Office 3,481,806
Patented Dec. 2, 1969

3,481,806
METHOD OF MAKING A BANDAGING AND DRESSING MATERIAL
Dan B. Wicker, Loudonville, N.Y., James G. Bennett, Jr., Pittsfield, Mass., and Lowell G. Ward, East Greenbush, N.Y., assignors to Huyck Corporation, Rensselaer, N.Y., a corporation of New York
Original application Sept. 23, 1964, Ser. No. 398,593. Divided and this application Sept. 5, 1967, Ser. No. 671,531
Int. Cl. B32b *31/08*
U.S. Cl. 156—148                    14 Claims

ABSTRACT OF THE DISCLOSURE

The invention relates to methods of making medical dressings which are absorbent of body exudates, yet are made non-adherent by means of a foraminous, smooth, surfaced, contact layer made using heat fused, hydrophobic, thermoplastic fibers.

---

This is a division of application Ser. No. 398,593, filed Sept. 23, 1964.

This invention relates to methods of making materials especially adapted for use as bandages or medical dressings and for sponges to be applied to open cuts or wounds of the human body. The products of these methods involve a combination of layers of fibrous materials adapted to receive and absorb body fluids from an open cut or wound and so retain the same in relation to the cut or wound as to enable ready removal of the bandage or dressing without injury to the cut or wound and to expedite the healing action of the same.

Various types of bandaging and dressing materials have been proposed heretofore, but none of these have involved the combination of features contemplated by the present invention for enabling the removal of such materials from the wound, with the exuded fluids effectively retained by the material without the danger of removing any part of the healing scab from the injured surface for replacement by a new section or strip of such material.

For achieving the foregoing purposes the products of the present invention envision the provision in a relatively thin, flexible and soft flat or contoured bandaging or dressing material of at least two, and preferably three, or possibly more, layers of different types of materials. All of these layers are preferably formed of fibers which may be interlocked by techniques other than weaving or knitting thereof into a continuous fabric. This greatly facilitates and renders more economical, the production of the final product. However, certain of the advantages of the invention can be achieved by the use of a woven or knitted gauze as one or more of the layers of the composite material adjacent one surface thereof.

More particularly, considering the invention as applied to a three layered fibrous material, one of the layers is formed from fibers produced from a synthetic resin of a character capable of withstanding sterilizing treatments at temperatures required for this purpose, but capable of softening to a semi-fluid extent upon subjection to a temperature higher than that required for sterilization but lower than that which will deleteriously affect the other layers, as by scorching or the like. An excellent type of fiber for this purpose is formed of polypropylene, but other synthetic fibers may achieve the same purpose to a certain extent, as for example, polyvinylidene chloride which softens at 240° F. to 280° F., and polyvinylidene dinitrile which softens and becomes sticky at about 340° F. It is important, however, that the fibers employed have properties of the character herein specified. The said higher temperature treatment of this synthetic fiber material, together with some pressure applied thereto, causes the synthetic fibers to bond and also serves to eliminate the projection of free fibers from, and to provide a smooth feel to, its exposed surface, which is the intended to be applied to the wound, but without forming a continuous film surface that will eliminate, or objectionably reduce the number of capillary passages extending through such layer. In fact the heat treatment referred to serves to reduce the cross-sectional area of such passages and thus increases their ability to transmit fluid by capillary action.

In accordance with the invention the layer referred to just above is formed of a synthetic resin which is hydrophobic and will therefore not absorb the moisture removed from the wound but will simply transfer it by capillary action and by the low hydrostatic pressure developed in the wound to the next layer of the material. Said next layer is highly desirable in the nature of a wadding formed of fibers highly capable of absorbing the exuded fluid from the wound and also capable of transmitting the fluid laterally to cause it to be absorbed in all regions thereof. For this purpose, said layer may highly desirably be formed of cellulose fibers, derived from either soft or hard wood, preferably with the fibers disposed in relation to each other in the same manner as in a sheet of paper, but it may be formed from carded cotton fibers or other similar materials or by curlating or garnetting or otherwise forming the fibers into wadding. It has good fluid absorption properties and tends to retain the majority of the fluid exuded from the wound and to distribute said fluid throughout the area of said layer.

If the amount of body fluid is such that it cannot be retained by the cellulosic wadding, during the interval between changing of the bandaging or dressing material, it may be delivered to a third layer, preferably formed of rayon. For best results, this is a carded web that is applied to the intermediate cellulosic layer by pressure, prior to the application of the first mentioned synthetic resin layer. It is preferably formed of rayon fibers having a length of between about one inch and 2 inches and a relatively small denier, i.e. around 3 denier. It can however, with some loss of advantage from its desirable properties, be replaced by a gauze formed of cotton or the like.

Where a three layer structure such as that heretofore described is employed, the second layer may be used primarily for the purpose of holding the highly absorbent fibers of the third layer in place so that they may be easily handled throughout the various steps of processing, such as those hereinafter described. In such a case, it is desirable that the material from which the second layer is formed should have the properties heretofore set forth with reference to it, in addition to that of providing a good carrier medium for the absorbent material. Thus, it is possible to practice this invention without the presence of what has heretofore been described as the material forming the second layer, by utilizing materials having the high absorbency and other characteristics herein described as characterizing the materials of the third layer, in combination with the first layer alone or in concert with other layers and the first layer.

It should also be pointed out that the most important charactristic of the material herein described for use in the third layer is absorbency, without limitation as to the physical form which it takes. Thus fibers of rayon or other synthetic material might be used, or a foamed or sponge-like layer or any other material capable of aborbing body fluids in quantity.

It will be noted from the foregoing that the invention contemplates the highly preferred production of the final product without the necessity of forming any of the various components by weaving or knitting them into the form of a fabric or gauze, or the like. However as indicated above, certain advantages of the invention can be achieved through the use of a woven or knitted gauze as one layer of the composite fabric.

In the case of a three layered construction, the second layer, made from material such as cellulose or cotton wadding, and the rayon or the like forming the third layer of the final product, may be overlapped and united to each other by the application of suitable pressure to produce a continuous web of the two layers. The synthetic resin fiber layer may then be applied to the exposed surface of the cellulose layer by lapping a suitable number of layers or carded fibers of the same through the use of apparatus well known in the art of producing multiple layer webs. Preferably six to ten thin layers of such carded synthetic fibers may be lapped to the exposed surface of the cellulosic layer, as the latter with its united rayon layer or guaze is continuously advanced along a predetermined path, by passing and folding a continuous length of said carded, synthetic fibers back and forth across the path of advance of the cellulosic layer and the layer of rayon or the like.

The continuously advancing web of the three layers of different types of fibers is then passed through a needling mechanism, provided with reciprocating barbed needles which carry fibers of the synthetic layer down through the cellulose wadding and rayon or other selected types of layers. As a result of this some of the fibers of the resin layer are carried down through the other layers, to firmly unite the three layers together and improve the overall properties of the bandaging material. By so needling the several layers it is insured that none of the fibers of the wadding or rayon layers are carried outwardly to the exposed surface of the synthetic resin fiber layer. Thereafter, the three thus united layers are passed through a suitable calendering mechanism which serves to squeeze the three layers of different types of fibers and to apply heat at a suitable temperature to the outer surface of the synthetic resin fiber layer. Such calendering apparatus is adapted to impart heat to the exposed surface of the synthetic resin fiber layer to raise its temperature to its softening point. When the synthetic resin fibers are formed of polypropylene the heated roller of the calendering apparatus may be maintained at a temperature of about 330° F. If other synthetic resin fibers are used, the temperature of the heated roller at this stage of the process may be varied to impart sufficient heat to the fibers to soften them, without completely melting the same. This brings about a slight fusion of the resin fibers to such an extent as to produce a relatively smooth feel to its outer surface, with the elimination of any free projecting fibers and without closing off the capillary passages through said resin fiber layer provided by the disposition of the fibers thereof and by the action of the barbed needles, and without damaging any of the other layers of the material.

In the use of the foregoing web as a bandaging material the synthetic resin fiber layer, with its relatively smooth and comfortable feeling exposed surface, with no free projecting fibers, will be applied to the open cut or wound on the body of a person, with the other layer or layers disposed outwardly thereof, while in the use of the material as a dressing it will preferably, but not necessarily, be folded over to apply the synthetic resin fiber layer against the body and also exposed on the outer face of the dressing, with the rayon or similar layer having surfaces in directly opposed relation and the cellulosic or like layer intermediate the two other layers mentioned. In either case the hydrophobic synthetic fiber layer, with its smooth exposed surface free from projecting fibers, will pass the body fluids, by capillary action and hydrostatic pressure, to the other layers and will thus guard against the removal of a portion of scab, that may be formed at the surface of the wound, as the dressing is removed. The calendering of the material, with the polypropylene layer arranged to engage the hot surface of one of the rolls, will serve to eliminate any free fibers extending from the surface that will be applied to and become embedded in the wound. This will greatly minimize the entanglement with blood fibrils and the danger of removing any portion of the scab that has formed, or is in the process of formation, upon removal of the bandaging or dressing material.

Certain of the advantages of this invention may be obtained by subjecting the fibrous resin layer alone to a forming and heat treating operation such as that heretofore described, using a heat treatment technique whereby only one surface of the layer is elevated to the fusing temperature while under pressure. This may be accomplished by use of a pair of press rollers only one of which is heated to the fusing temperature or by use of a cloth carrier medium in contact with the side of the layer which faces away from the heated roller, or by other similar techniques which are known in the art for achieving the indicated purpose. By this means, the fibrous resin sheet will have one smooth surface of the quality and having the properties heretofore described as being desirable for non-adherent body contact and the other surface will still be fuzzy. In this form the fibrous resin layer may later be combined with any of a wide variety of commonly used absorptive materials, such as cotton or rayon, with the smooth side of said layer toward the source of the body fluids and the absorptive material placed against the fuzzy side of the fibrous resin layer. The fibers extending from the fuzzy side of the fibrous resin layer will then be intermingled with the absorptive material, thereby permitting the combination of components to freely absorb large quantities of body fluid and at the same time the non-adherent features heretofore described will be obtained.

A further feature of the invention involves embossing of the exposed surface of the synthetic resin fiber layer to impart a smooth feel and a more attractive appearance to the latter. This is of particular importance in the use of the materials as a folded dressing for wounds, as will be apparent from the following further description of the invention.

SUMMARY OF INVENTION

In accordance with one embodiment of this invention, a layer of absorptive material is formed, to one of the surfaces of which is then applied a layer of fibers formed from a thermoplastic resin which is hydrophobic; the layers are united by forcing some of the resin fibers into the absorptive material; and the exposed surface of the resin fiber layer is subjected to heat and pressure sufficient to cause any free fibers projecting from the exposed surface of said layer to be laid down and at least some of the fibers of said layer to fuse.

With the foregoing features and advantages of the invention in mind, a preferred embodiment of the invention will now be described in somewhat greater detail in connection with the accompanying drawings, in which:

FIG. 7 is a schematic view illustrating the arrangement of apparatus employed in carrying out the initial portions of the process;

FIG. 8 is a similar schematic view showing the arrangement of apparatus for carrying out further steps involved in the process, and FIG. 9 is a schematic view, in elevation, of apparatus for carrying out still further steps of the process.

Figure 1:
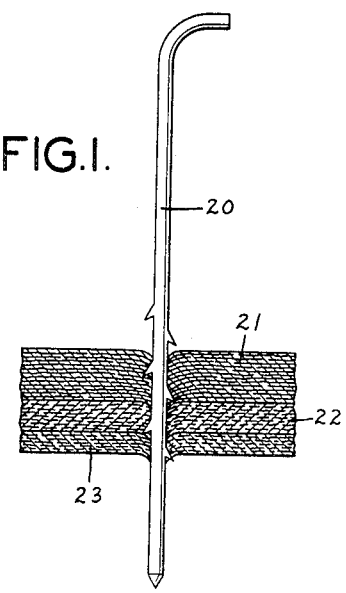
FIG. 1 is a schematic view, on an enlarged scale, showing a barbed needle in relation to the three layers forming the bandaging material at the needling step of the process.

Referring now particularly to FIGS. 7–9 inclusive, the apparatus employed for carrying out the process of producing a preferred embodiment of the improved dressing or bandaging material will first be described. At 10 (FIG. 7) there is indicated a carding machine which receives the rayon fibers to be used in making one layer of the material, in accordance with the preferred embodiment of the invention. The fibers so employed are preferably about 1⅛ inches in length and have a denier of about 3, but the length and denier of the fibers may be varied to a certain extent within the capabilities of the selected carding machine. These fibers, as indicated, may be formed into a web by a carding machine and are preferably deposited in web form on an endless conveyor belt (not shown). As the rayon web is advanced in the direction indicated by the arrow in FIG. 7, it passes through a zone 11 in which the layer of cellulosic wadding or the like is applied to its upper surface. This layer is preferably formed of either soft or hard wood fibers having a length of between 1 and 5 millimeters formed into a continuous sheet on a paper making machine. It is preferably a rather dense layer, considerably more so than the rayon fiber layer. At the delivery station 11, such continuous web or sheet of the cellulosic wadding may be directed downwardly from a large supply roller to the upper surface of the rayon web, with the two layers being advanced at the same speed. If the cellulose wadding is replaced by, or in the nature of, a cotton wadding, this may be produced on a carding machine similar to that used for the rayon web, needled or otherwise compacted by pressure and delivered from such carding machine to the upper surface of the rayon web in the region 11. With respect to all of the various layers of the composite material, the preferred fiber lengths will depend somewhat upon the nature of the processing equipment used.

From the region 11 the two layers, namely the rayon web and the cellulosic wadding are delivered to a pair of rollers 12, only the upper one of which is shown in FIG. 7. A corresponding roller is provided directly beneath the one indicated at 12 and the two rollers thus serve to compress the rayon web and cellulosic wadding together to a certain extent, thus causing them to become laminated, with or without adhesive means for bonding them together. The lower roller cooperating with roller 12 may carry the conveyor belt on which the web and wadding are deposited, and this belt may then be returned to the left end of the apparatus, at which a similar roller may be provided for supporting the endless belt. Any suitable means may be provided for driving the belt at the desired speed. The laminated layers of rayon web and cellulosic wadding are delivered to a winding roller 13 which is rotated, in the direction indicated by the arrow, to wind a suitable length of this laminated material into a roll. In the course of such winding the fibers of the two layers will be pressed together further to insure interlocking of certain of their fibers.

Figure 2:
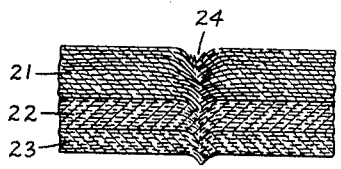
FIG. 2 is a cross-sectional view through the several layers of the material, on an enlarged scale, in the region of the opening provided by a barbed needle, this being taken along the line 2—2 of FIG. 3.
Figure 3:
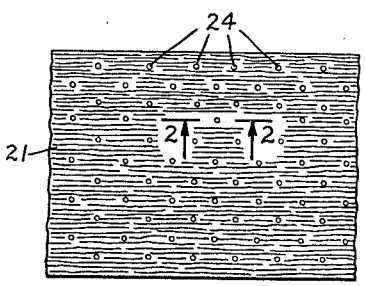
FIG. 3 is a plan view, on an enlarged scale, of a small section of the bandaging or dressing material.
Figure 4:
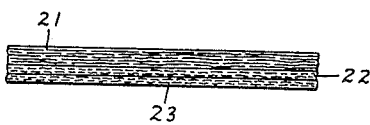
FIG. 4 is an enlarged cross-sectional view through a portion of the material prior to the needling operation thereon.

Referring now to FIG. 8, the roll of the two layers wrapped about the winding roller 13 is suitably mounted in the frame structure of a machine for delivery of the rayon and cellulosic laminates in the direction indicated by the arrow 14. As the two layers are thus advanced, with the cellulosic wadding layer at the upper surface, there is deposited on the exposed face of the latter a batt of polypropylene fibers. This batt is produced by a carding machine 15 which delivers the polypropylene fibers in carded form in the direction indicated by the arrow 16. The fibers of polypropylene preferably have a length of between 1 inch and 8 inches, although fibers having a length between 2 inches and 4½ inches have been found particularly desirable, and a nominal denier between 1.5 and 6, it being recognized that in making synthetic fibers of a desired denier, the actual denier may vary somewhat. These carded fibers, as delivered along the path indicated by arrow 16, are lapped back and forth across the upper surface of the cellulosic layer of the laminate delivered from the roller 13. For this purpose a lapping machine, of known character, may be used to provide about 6 to 8 layers of the carded polypropylene fibers to the surface of the cellulosic wadding in the region indicated at 18. From this point the three layers, with the polypropylene batt uppermost, are passed through the needling machine indicated at 19. This needling machine is provided with a plurality of barbed needles 20, of the character shown in FIG. 1, the number of these needles employed and the frequency with which they are reciprocated in a vertical direction in relation to the rate of advance of the three layers of the material formed in the manner described above, should be such as to impart between about 100 and 200 needle satisfactory form of the desired product, about 140 needlings per square inch have been provided. The needling will produce the effect indicated on an enlarged scale in FIG. 2; namely, it will carry portions of the polypropylene fibers 21 downwardly through the cellulosic fibers 22 and rayon fibers 23. This results in bonding the various layers more firmly together and also in providing further capillary passages through the material. Furthermore, by effecting the needling action in the direction indicated there is no danger of having fibers of the cellulose wadding or the rayon layers carried to the exposed surface of the synthetic resin layer. The needle openings thus formed are indicated at 24 in FIG. 3.

After passage of the three layers of the material through the needling machine they are advanced in the direction indicated by the arrow 25 (FIG. 9) to a calendering apparatus. This comprises a hot roller 26, which is in contact with the synthetic resin (polypropylene) layer 21 of the material while the rayon layer 23 cooperates with a lower roller 27 which is not heated and is preferably in the form of a filled roller, i.e. a solid non-metallic roller formed of materials having low heat transfer properties.

In passing through the nip of the rollers 26 and 27 the three layers are pressed together, simultaneously with the heating of the outer surface of the polypropylene batt. It has been found desirable to employ a heated roller having a diameter of about 7 inches and a lower filled roller having a diameter of about 12 inches. These rollers are preferably rotated at such a speed as to cause the laminated material to travel at a rate of about 28 feet per minute. Roller 26 is preferably heated to a temperature of about 330° F., which is sufficient to soften the engaged fibers of polyproplene and thus eliminate the projection of such fibers outwardly from the upper surface of the material, and in fact provide a quite smooth feel to such exposed surface. The temperature of roller 26, and the time during which the polypropylene fibers are in contact therewith, are such that the capillary passages through the polypropylene batt will not be closed off, but in fact are insured of and will be improved in their capillarity and ability to transmit body fluid by hydrostatic pressure. In producing the desired form of the end product, it has been found desirable to urge the rollers 26 and 27 toward each other under a force of 100 pounds per linear inch of that portion of the rollers which are in contact with the material.

The material leaving the calendering rollers may be delivered to a winding roller and thus constitute the final form of the dressing or bandadging material. Before such winding, however, the polypropylene layer should be cooled sufficiently to avoid any tendency of it to adhere to the next wrap of the material around the winding roller.

Figure 6:
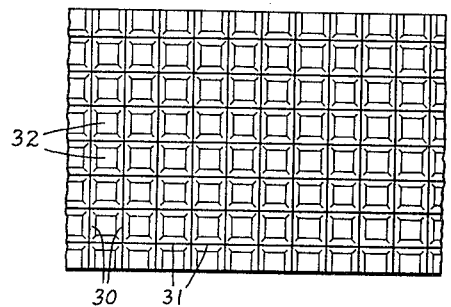
FIG. 6 is a plan view, on an enlarged scale, of a small portion of the material, showing its appearance after it has been embossed in accordance with one possible aspect of the invention.

It has been found desirable, in some instances, to improve the appearance and feel of the dressing or bandaging material by embossing the exposed surface of the polypropylene batt. For this purpose, as shown in FIG. 9, the laminated material after passing through the calendering zone may be passed between a pair of rollers 28 and 20. The upper roller 28 will be heated to a suitable temperature, preferably about 300° F., and will have its outer surface provided with any desired form of design to be embossed upon the upper surface of the polypropylene batt. As indicated in FIG. 6, such design may, for example, produce slight ridges 30 and 31 arranged in rectangular relation to each other and slightly depressed surfaces 32.

When the material produced in accordance with this invention is to be used for bandaging purposes, a suitable length of the same will, after being sterilized by recognized procedures, be wrapped around the arm or leg or the like in the region in which the wound exists. In such use of the material, the exposed surface of the polypropylene batt will be applied to the surface of the body.

If desired, a small section of the material of the present invention may have applied to its outer surface, i.e. the opposite side from the smooth synthetic fiber layer surface which contacts the body, an adhesive tape of conventional character adapted to retain the bandage in the desired location. The resulting product would then be in the category of what is generally designated an adhesive dressing.

Figure 5:
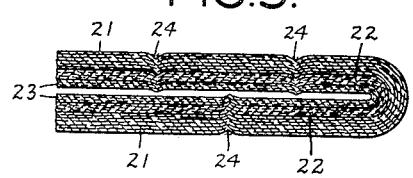
FIG. 5 is an enlarged cross-sectional view through a portion of the bandaging or dressing material folded over upon itself, as used for dressing material purposes.

When the material is to be used for dressing purposes, it may also be used in such single layer form or it may be folded over, as indicated in FIG. 5, with the polypropylene batt having its outer face exposed at both surfaces of the folded material. Thus this exposed face of the batt will be placed in contact with the wound being dressed and will also be exposed at the outer surface of the dressing. This provides a dressing having a smooth, comfortable feeling exposed surface, which is particularly attractive in appearance, and especially so if the polypropylene layer has been subjected to the embossing step described above.

While polypropylene fibers of the character above described have been found exceptionally well suited for the purposes of the invention, other synthetic resin fibers, such as those mentioned above, having the properties mentioned, may be used advantageously. The resin fibers should be of a hydrophobic character, should be capable of sterilization in ambient low-pressure steam without softening or unduly shrinking or deteriorating the fibers, and capable of being readily softened at a temperature below 400° F. by the calendering of the same as it is passed in contact with a heated calendering roller.

What is claimed is:

1. A method of making a multi-layered structure for absorbing body fluids which comprises forming a first layer of material which is highly absorptive of body fluids, applying to one surface of said first layer a second layer formed from fibers of a thermoplastic resin which is hydrophobic and fusable only at a temperature higher than that necessary to sterilize said structure, uniting said layers by forcing some of the fibers of said second layer into the material of said first layer, and subjecting the exposed surface of said second layer to pressure sufficient to cause any free fibers thereto be laid down and to heat at a temperature above the fusing temperature of the fibers thereof, thereby causing at least some of the fibers of said second layer to be fused.

2. A method as set forth in claim 1 in which the uniting of said layers is performed by needling operation that serves to carry fibers of said second layer into said first layer without causing any part of the first layer to be carried to the exposed surface of the second layer.

3. A method as set forth in claim 1 in which the temperature to which the structure is subjected in the course of heating the exposed surface of said second layer above the fusing temperature of the fibers thereof is below that at which the structure will be detrimentally affected.

4. A method of making a bandaging or dressing material which comprises forming a layer of fibers selected from the group of rayon and cotton fibers, applying thereto a wadding of fibers of highly absorbent character, uniting said first mentioned layer of fibers and said wadding of fibers by applying pressure thereto, thereafter applying cross-lapped multiple-layers of a synthetic resin fibers having a softening temperature within a range above 200° F. and below 400° F. to the exposed surface of said wadding of fibers, subjecting the several layers to a needling operation to carry certain of said synthetic resin fibers downwardly through the other layers to interlock the fibers of the various layers, and thereafter subjecting the outer surface of the layer of synthetic resin fibers to heat and pressure at a temperature within the softening range thereof but below the melting point thereof.

5. In a method as set forth in claim 1, said thermoplastic resin fibers being formed of polypropylene.

6. In a method as set forth in claim 4, said first mentioned layer being rayon fibers carded into a web form.

7. In a method as set forth in claim 6, said rayon fibers having lengths of about 1 to 2 inches and an average denier of about 3.

8. In a method as set forth in claim 4, said wadding being formed of cellulosic fibers having a length of between 1 and 5 mm.

9. In a method as set forth in claim 1, said thermoplastic resin fibers having lengths between 1 and 8 inches and an average denier between 1.5 and 6.

10. In a method as set forth in claim 2, said needling operation involving the passage of barbed needles through the several layers of said material to provide between about 100 and 200 needle penetrations per square inch of the material.

11. In a method as set forth in claim 1, said thermoplastic resin fibers being cross-lapped in relation to said first layer to provide between 6 and 8 layers of said synthetic resin fibers in carded form throughout the length of said material.

12. In a method as set forth in claim 11, said needling operation serving to carry fibers from said multiple-layers of synthetic resin fibers downwardly through said first layer to substantially the lower surface of the structure.

13. In a method as set forth in claim 1, said application of heat to the exposed surface of said plastic resin layer component comprising passing the multi-layered structure between a pair of rollers, one of said rollers being a smooth surface hollow metallic roller which is internally heated and arranged to cooperate with the exposed surface of said plastic resin layer, and the other of said rollers being a non-heated filled roller arranged to cooperate with the exposed surface of the first mentioned layer.

14. In a method as set forth in claim 13, said multi-layered structure being subjected to a further heat treating step, comprising passing the same through the bite of a pair of further rollers, one of which is heated to a temperature within the softening range of the plastic resin layer and is in contact with the outer surface thereof, the surface of said one of said rollers being corrugated and serving to emboss the exposed surface of said plastic resin layer.

References Cited

UNITED STATES PATENTS

| | | | |
|---|---|---|---|
| 2,429,486 | 10/1947 | Reinhardt | 161—81 |
| 2,840,881 | 7/1958 | Bateman | 161—154 XR |
| 2,923,298 | 2/1960 | Dockstader et al. | 128—296 |
| 3,060,514 | 10/1962 | Lachiche | 156—209 XR |
| 3,122,140 | 2/1964 | Crowe | 156—148 XR |
| 3,223,567 | 12/1965 | Trewella | 156—285 XR |
| 3,285,245 | 11/1966 | Eldredge et al. | 128—156 |
| 3,292,619 | 12/1966 | Egler | 128—156 |
| 3,307,545 | 3/1967 | Surowitz | 161—81 XR |
| 3,336,923 | 8/1967 | Devaud | 128—156 |

HAROLD ANSHER, Primary Examiner

G. W. MOXON II, Assistant Examiner

U.S. Cl. X.R.

156—209, 219

UNITED STATES PATENT OFFICE
CERTIFICATE OF CORRECTION

Patent No. 3,481,806      Dated December 2, 1969

Inventor(s) Dan B. Wicker et al.

It is certified that error appears in the above-identified patent and that said Letters Patent are hereby corrected as shown below:

Column 6, line 42, after "200 needle" insert
-- penetrations per square inch of the material --.

Column 7, line 27, delete "20" and insert -- 29 --.

Column 8, line 10, delete "thereto" and insert
-- thereof --.

Signed and sealed this 3rd day of December 1974.

(SEAL)
Attest:

McCOY M. GIBSON JR.
Attesting Officer

C. MARSHALL DANN
Commissioner of Patents